United States Patent [19]

Hund et al.

[11] Patent Number: 5,113,054
[45] Date of Patent: May 12, 1992

[54] METHOD FOR JOINT WELDING OF SMALL STRUCTURAL COMPONENT PARTS

[75] Inventors: Paul Hund, Schwieberdingen; Lothar Langer, Bissingen; Wolfgang Jenner, Erdmannhausen, all of Fed. Rep. of Germany

[73] Assignee: Robert Bosch GmbH, Stuttgart, Fed. Rep. of Germany

[21] Appl. No.: 432,736

[22] PCT Filed: Feb. 1, 1989

[86] PCT No.: PCT/DE89/00060

§ 371 Date: Oct. 27, 1989

§ 102(e) Date: Oct. 27, 1989

[87] PCT Pub. No.: WO89/08001

PCT Pub. Date: Sep. 8, 1989

[30] Foreign Application Priority Data

Feb. 27, 1988 [DE] Fed. Rep. of Germany ....... 3806309

[51] Int. Cl.⁵ .............................................. B23K 11/00
[52] U.S. Cl. ................... 219/117.1; 219/86.1
[58] Field of Search ................... 219/117.1, 118, 98, 219/99, 86.1

[56] References Cited

U.S. PATENT DOCUMENTS

| | | | |
|---|---|---|---|
| 3,488,841 | 1/1970 | Stern | 219/99 |
| 4,385,222 | 5/1983 | Hinden | 219/118 |
| 4,752,026 | 6/1988 | Van De Griend | 219/98 |

FOREIGN PATENT DOCUMENTS

| | | | |
|---|---|---|---|
| 0192105 | 2/1986 | European Pat. Off. | |
| 2183859 | 12/1983 | France | |
| 58-196187 | 11/1983 | Japan | |
| 62-156080 | 7/1987 | Japan | 219/118 |

Primary Examiner—Clifford C. Shaw
Attorney, Agent, or Firm—Michael J. Striker

[57] ABSTRACT

A method for the joint welding, particular resistance welding, of small structural parts by applying heat and pressure thereto, wherein the pressure and heat are applied through a pressure-deformable transmitting material to which pressure is applied by a pressure- and heat-transmitting element. The pressure transmitting contact surface between the deformed transmitting material and one of the structural parts acting as shaping body, is greater than the surface at which the structural parts are welded together.

11 Claims, 2 Drawing Sheets

METHOD FOR JOINT WELDING OF SMALL STRUCTURAL COMPONENT PARTS

BACKGROUND OF THE INVENTION

The invention relates to a method of joint welding, particularly resistance welding, of small structural component parts wherein the parts are pressed together by a transmitting element and are welded by application of heat. Such a method, in which a plurality of electrical conductors or a disk of brittle material is assigned to the small or miniature structural component parts, is known from DE-AS 17 52 679. The base and the conductors are brought together, pressed together by the transmitting element and are welded together in cooperation with the transmitted pressure by thermal compression or ultrasonics. The pressure is transmitted by a deformable transmitting material which is acted upon by the transmitting element and acts directly and simultaneously on all conductors and on the entire assigned surface of the disk, respectively. Accordingly, a connecting method is to be achieved which increases the rate of good connections achieved when the thickness of the structural component parts is subject to tolerances and which can also be used simultaneously for producing a plurality of connections. The conductors are exposed to a deformation when applied to the base, the magnitude of the deformation depending on the utilized materials, the mechanical energy supplied, the geometrical form of the pieces, and the heat supply. In the initial phase of the welding process, the pressure at the boundary surface between the transmitting material and the conductors is higher by a multiple than the pressure at the boundary surface between the transmitting element and the transmitting material due to the much smaller contact surface. If the transmitting material has deformed around the conductors and contacted the base, the contact area increases as the pressure decreases until it corresponds to the magnitude of the boundary surface between the transmitting element and the transmitting material, i.e. the pressure drops and the deformation stops. When applying the method for welding disks comprising a hard material which can not be deformed, e.g. metallized silicon, no pressure differential occurs between the two boundary surfaces between the transmitting material and disk and between the disk and base, since the boundary surfaces have the same dimensions.

Further, a device is known from DE-PS 20 49 277 for welding spherical contact metal blanks on contact parts by electrical resistance welding, in which device, an electrode is provided with a cup-shaped recess at its head end for receiving a spherical contact metal blank. In this device, the pressure and heat are transmitted by the electrode directly to the ball to be welded on.

SUMMARY OF THE INVENTION

The object of the invention is a method of joint welding in which the pressure transmitting contact or boundary surface between the structural component part, which acts as shaping body, and the transmitting material is drastically increased by deformation of the latter, while the boundary surface between the structural component parts at which the welding takes place is comparatively small and, under pressure and the influence of heat, preferably also remains clearly smaller than the pressure transmitting contact surface between the deformed transmitting material and the structural component part acting as shaping body. The object of the invention is achieved by making the pressure-transmitting contact surface between the deformed transmitting material and the structural component part acting as a shaping body, greater than the surface at which structural component parts are welded together. With this method, it is possible to produce structural components comprising a plurality of individual parts, e.g. spherical valve bodies, in a simple manner without the original shape and material structure of the exposed portion of the ball, which acts a shaping body, being changed during the welding process. The pressure required for welding is transmitted to the shaping body by the deformed transmitting material along a large surface area and without partial pressure points, so that the compressive load of the body per surface area unit remains relatively small. At the same time, the pressure is concentrated on the comparatively small boundary surface between the structural component parts and ensures that the two parts are pressed against one another very securely in this area. In the preferred aforementioned resistance welding, a transmission of current over a large surface area is effected via the deformed transmitting material with low contact or transition resistance, accompanied by comparatively low and uniform heating of the exposed portion of the ball covered by the transmitting material. On the other hand, in the area of the welding the current is concentrated on a small surface with large contact resistance, so that the materials at this place heat quickly and pass into the plastic or molten phase required for the welding. The high surface-area pressure prevailing in the area of the welding zone contributes to the acceleration of this process. A material, particularly a metallic blank material, which is plastically deformed under the influence of pressure, is preferably used as transmitting material. A copper foil has proven particularly advantageous for this purpose because it is easily deformable and can be highly loaded thermally. In order to enable a deformation of the foil under the influence of pressure, the transmitting element can comprise a hollow space into which the foil is pressed by means of the structural component part acting as shaping body. According to an additional feature of the invention, this hollow space can be adapted to the outer contour of the shaping body. Another possibility which permits the use of transmitting elements with plane contact surfaces consists in that the foil is coated with a layer of thick, soft material, e.g. a Pb or PbSn layer, in which the outer contour of the structural component part acting as shaping body is formed under the influence of pressure.

The present invention, together with additional objects and advantages thereof, will be best understood from the following detailed description of the preferred embodiments with reference to the accompanying drawings.

DESCRIPTION OF THE PREFERRED EMBODIMENTS

Figure 1:
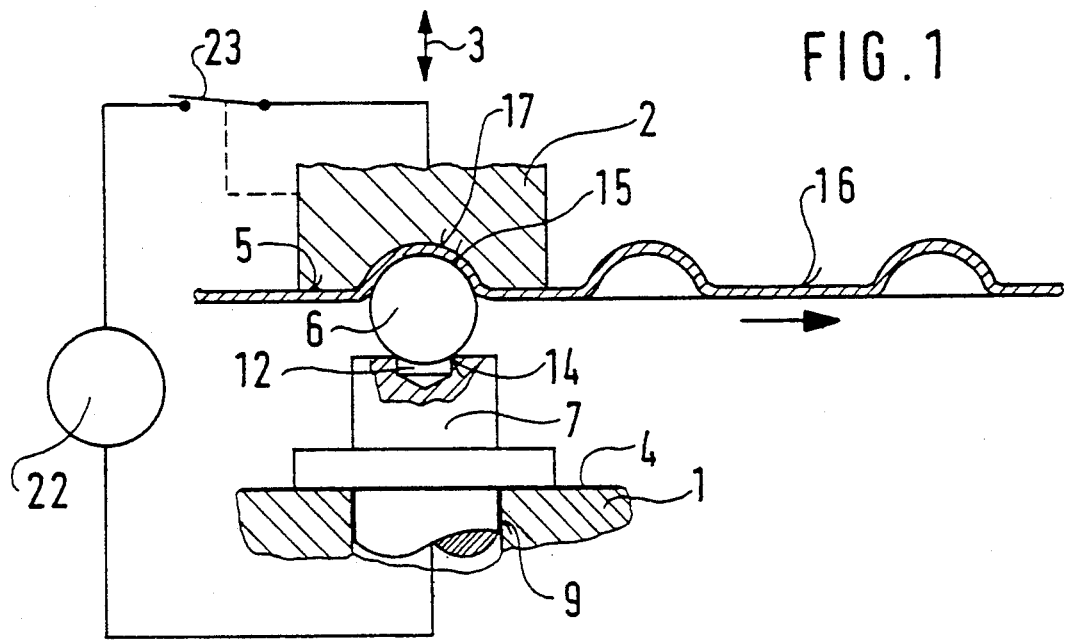
FIG. 1 shows a simplified partially sectional view, of a first embodiment of a resistance welding device for producing a spherical valve body comprising two parts, according to the method according to the invention.
Figure 3:
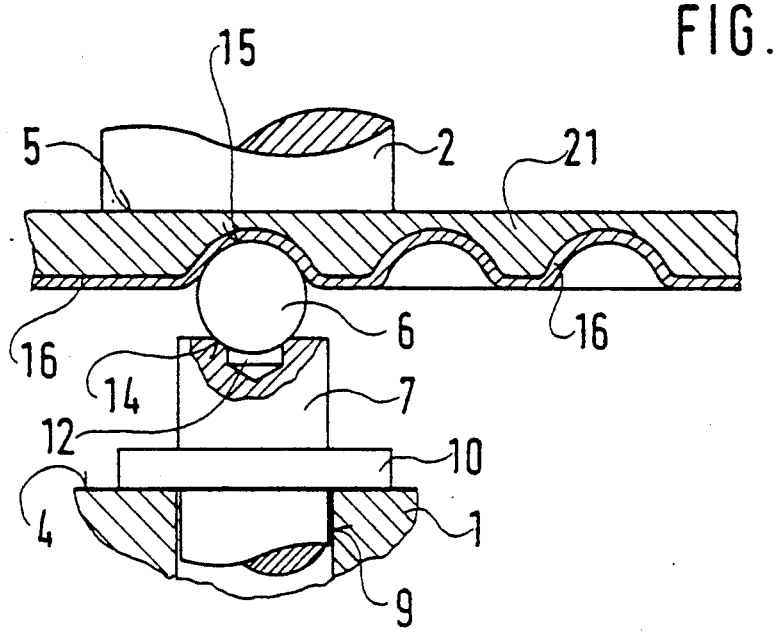
FIG. 3 shows the same views as FIGS. 1 and 2 of a device with a plane shaping electrode and a deformable transmitting material comprising two components.
Figure 4:
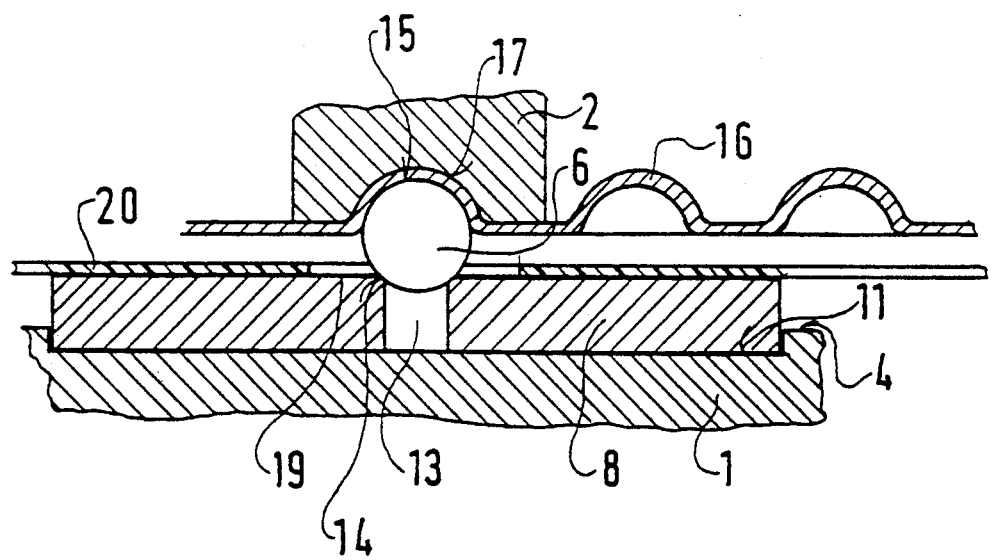
FIG. 4 shows a partially sectional side view of a device similar to that of FIG. 1 in which the disk-shaped ball holder of the spherical valve body is coated with an insulating material foil.

The resistance welding device shown schematically in the drawing has a bottom stationary electrode 1 and an upper electrode 2 which is arranged opposite the latter at a distance and can be raised and lowered in the direction of the double arrow 3 shown in FIG. 1. The plane end faces 4 and 5 of the two electrodes 1 and 2 are parallel to one another. The electrodes are connected to a welding circuit and serve for the joint welding of small structural component parts which comprise a hardened steel ball 6 and a ball holder 7 (FIGS. 1 to 3) and 8 (FIG. 4). The two parts form a valve body for spherical valves when welded together. The ball holder 7 is constructed as a solid cylinder pin which can be inserted into a bore 9 of the bottom electrode 1 and is supported at the end face 4 of this electrode by a collar 10. The ball holder 8, according to FIG. 4, is constructed as a flat disk for which a receptacle in the form of a recess 11 is provided in the lower electrode 1. The ball holder 7 is provided at its end face with a blind bore 12 which receives and centers the ball 6. The ball holder 8 has a continuous bore 13 for the same purpose. In both cases, the diameter of the bore is considerably smaller than the ball diameter, so that the ball can only penetrate into the bore by a small portion. The larger portion of the ball is easily accessible via the ball holder 7 and 8. The ball and bore contact along a circular line or circular surface 14 with small width. The two portions 6, 7 and 6, 8 are welded together at this surface.

The pressure and heat required for welding are supplied to the parts 6, 7 and 6, 8, respectively, via the electrodes 1, 2 by lowering the upper electrode 2 and switching on the welding current. In order to prevent a deformation and/or a change in the structure of the material of the exposed portion of the ball 6, the upper electrode 2 is not placed directly against the exposed portion of the ball 6. Rather, there is a deformable transmitting material between the ball 6 and the electrode 2 which distributes the pressure exerted by the electrode 2 and the welding current in the area of the exposed portion of the ball to approximately half of the entire spherical surface. It is preferable to use a material with low specific electrical resistance which deforms plastically under the influence of pressure.

Rubber-elastic materials which comprise electrically conducting material and restore their original shape after pressure is relaxed, can also be used instead of plastically deformable materials. It is essential that the pressure-transmitting contact surface 15 between the deformed transmitting material and the exposed portion of the ball 6 acting as shaping body is clearly larger than the surface 14 at which the structural component parts are welded together. Accordingly, it is ensured that the pressure from the electrode 1 is transmitted to the welding zone 14 along a large surface area of the ball and concentrated there, which welding zone 14 has a small surface area. The deformable transmitting material is adapted to the spherical surface and prevents partial deformations of the exposed spherical surface. Moreover, the large outer surface area of the free spherical surface ensures a small contact resistance between the transmitting material and the ball, so that the exposed portion of the ball is not subjected to any inadmissibly high thermal loads. On the other hand, the welding current in the area of the welding zone 14 is concentrated on a very small surface area, so that a fast heating of this zone to welding temperature is ensured. A thin, foil-like metal strip 16 consisting of easily deformable material having good electrical conductivity and a high melting temperature is preferably used as plastically deformable material. These requirements are met e.g. by a copper strip which has a good electrical conductivity and good ductility at a relatively high melting temperature.

In order to enable the desired deformation of the metal strip 16, the end face 5 of the upper electrode 2 in the embodiments according to FIGS. 1 and 4 is provided with a hemispherical cup 17 which is open at the bottom and is dimensioned in such a way that it is able to receive the upper half of the ball and the metal strip 16 enclosing the latter. The pressure of the upper electrode 2 deforms the metal strip corresponding to the spherical surface, wherein the ball 6 acts as shaping body. Small deviations of the cup shape from the ball shape are compensated for by the metal strip. After a successful deformation of the strip 16, the welding current is switched on for a predetermined time period and after successful welding accompanied by raised electrode 2, the metal strip 16 is stepped up by at least the diameter of the upper electrode 2. For example, a stepping mechanism, not shown, which is known per se, can be used for this purpose. Th transporting direction of the metal strip 16 is shown in FIG. 1 by an arrow.

Figure 2:
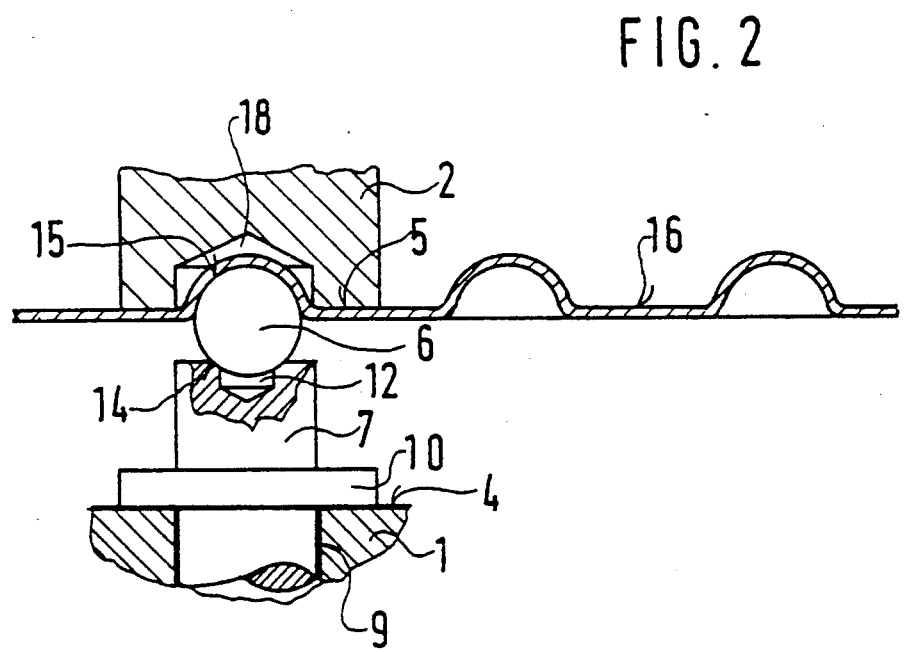
FIG. 2 shows a partially sectional side view of a device with a shaping electrode which is modified relative to the device shown in FIG. 1.

Instead of the spherical cup-shaped hollow space 17, a blind bore hole 18 which is formed in the end face 5 of the upper electrode 2 and whose diameter corresponds to the diameter of the ball 6 plus twice the thickness of the metal, strip 16 plus approximately 0.2 mm clearance in the electrode, is used in FIG. 2 for the deformation of the metal strip 16. During the welding process, the metal strip 16 is grasped by the circular bore hole edge and drawn around the ball far enough so that it covers the upper half of the ball. The pressure from the electrode 2 is transmitted via the metal strip 16 and the ball to the contact surface 14 between the ball and the ball holder, which contact surface 14 forms the welding zone, and is concentrated there on a small surface area. The ball holder is supported at the surface 4 of the lower, stationary electrode 1 by its collar 10 during the welding process.

The distance between the deformed metal strip 16 and the end face of the ball holder 7 and 8, respectively, is determined according to the ball diameter and the diameter of the bore 12 and 13, respectively, which is formed in the ball holder. When welding balls having a very small outer diameter or valve bodies of the type shown in FIG. 4, in which the ball diameter is smaller by a multiple than the diameter of the ball holder 8, it is advisable to coat the surface of the ball holder with an insulating material foil which has a cut-out portion in the area of the bore hole of the ball holder in order to avoid welding current leakage. Such a foil 20 provided with a cut-out portion 19 is shown in FIG. 4.

In the embodiments described above, the two electrodes must be exactly aligned relative to one another so that the centering of the ball 6 in the bore hole 12 and 13, respectively, of the ball holder is maintained during the welding process. Such a high-precision alignment of the two electrodes is necessary in the arrangement according to FIG. 3 because the plane or end face 5 of the upper electrode 2 needs no hollow space influencing the position of the ball 6 with respect to the bore hole 12 and 13, respectively, of the ball holder. This is achieved in that the foil-like metal strip 16 is coated with a thick, soft metal layer 21 in which the upper half of the ball 6 duplicates itself under the influence of pressure. A Pb or PbSn layer can also be used, for example, as such a metal layer. The comparatively large end face of the electrode 2 prevents the soft metal layer 21 from sinking into the electrode to a great extent. As can be seen from FIG. 3, the thickness of the deformable work material combination 16, 21 is selected so as to be somewhat greater than the ball radius. During the welding process, the strip is pressed into the soft metal layer by the ball 6 after the application of pressure by the electrode 2, wherein an exact duplicate of the upper half of the ball is formed In balls whose diameter lies below 2.0 mm, the thickness of the metal layer 21 can also be smaller than the ball radius.

The proposed method ensures that no deformation or softening is effected outside the welding joint during the welding of high-precision parts, e.g. hardened balls, acting as sealing elements. With the use of a deformable transmitting material between the movable transmitting element, electrode 2, and the ball, this is achieved in that the contacting surface of the ball toward the movable transmitting element is kept as large as possible relative to the welding zone.

The method, according to the invention, for the joint welding of small structural component parts is not limited to the resistance welding of spherical valve bodies described with reference to the preferred embodiments. Rather, other structural component parts, particularly precision structural component parts, also consisting of hardened materials, in which the contact surface between the structural component parts which serves as welding zone is preferably made clearly smaller than the pressure transmitting contact surface covered by the deformed transmitting material, can accordingly also be welded together. In addition to the aforementioned preferred resistance heating, other heat sources can also be used for direct heating of the welding zone, e.g. heated dies or a gas flame directed to the welding point.

As was already indicated above, the welding current is switched on only after the deformation of the transmitting material 16 and 16, 21, respectively, is concluded to a great extent. For this purpose, a switch 23 can be arranged in the circuit of the welding current source 22 indicated in FIG. 1, which switch 23 is coupled with the movable electrode 2 and is closed by the latter when reaching its bottom end position. It is accordingly ensured that the welding current is distributed from the strip 16 to the entire exposed surface of the half-ball. A large surface area means a small current concentration and, accordingly, low heating. Overheating of partial surfaces of the half-ball, which could result in partial softening, are accordingly ruled out in a reliable manner. This step not only has significance for welding products in which the pressure transmitting contact surface between the deformed transmitting material and the shaping body is greater than the welding zone, but can also be used for welding structural component parts in which this condition is not met.

While the invention has been illustrated and described as embodied in a method for joint welding of small structure component parts, it is not intended to be limited to the detailed shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constituted essential characteristics of the generic or specific aspects of this invention.

What is claimed as new and desired to be protected by Letters Patent is set forth in the appended claims.

1. A method of joint welding of a shaped structural part with another structural part along a contact surface area therebetween, said method comprising the steps of providing a pressure- and heat-transmitting element; providing a pressure-deformable transmitting material between the pressure- and heat-transmitting element and the shaped structural part; moving the pressure- and heat-transmitting element to apply pressure to the pressure-deformable transmitting material to deform the pressure-deformable transmitting material about the shaped structural part and to thereby press the shaped structural part and the another part together, a contact surface between the deformed pressure-deformable transmitting material and the shaped structural part being greater than the contact surface between the shaped structural part and the another part along which the two structural parts are welded so as to transmit the pressure to the shaped structural part along a large surface and without partial pressure points; and applying heat to the two structural parts to weld the two structural parts together without changing a shape and a structure of the structural parts.

2. A method according to claim 1 wherein the step of providing the pressure-deformable transmitting material comprises the step of providing a plastically pressure-deformable constructional material.

3. A method according to claim 2 wherein the step of providing a plastically pressure-deformable constructional material comprises the step of providing an easily pressure-deformable foil having a high melting temperature.

4. A method according to claim 3 wherein the step of providing an easily pressure deformable foil comprises the step of providing one of a copper foil and a foil made of a copper alloy material.

5. A method according to claim 3 wherein the step of providing a pressure- and heat-transmitting element having a hollow space comprises the step of providing a pressure- and heat-transmitting element having a hollow space corresponding to an outer contour of the shaped structural part.

6. A method according to claim 3 wherein the step of providing an easily pressure-deformable foil includes the step of providing a thick layer of a soft material on a side of the foil facing the pressure- and heat-transmitting element the shaped structural part partially penetrating into the thick layer together with a respective portion of the foil upon deformation of the foil.

7. A method according to claim 6 wherein the step of providing a thick layer comprises the step of providing a thick layer of one of Pb material and PbSn material.

8. A method of resistance welding of two structural parts, comprising the steps of providing two electrodes for applying pressure and heat to the two structural parts, providing a layer of a pressure-deformable transmitting material between one of the two electrodes and one of the two structural parts; deforming the pressure-deformable transmitting material by removing the one of the two electrodes toward the other of the two electrodes to press the two structural parts together; and communicating welding current to the two electrodes to weld the two structural parts after deformation of the pressure-deformable transmitting material has been substantially finished.

9. A spherical valve body made of electrically conductive materials and comprising a ball holder having a bore of a predetermined diameter; a ball received in said bore and a having a diameter greater than said predetermined diameter of said bore, said ball being welded with said ball holder by applying pressure and heat to said ball and said ball holder; and a pressure-deformable transmitting material deformed about said ball.

10. A spherical valve body according to claim 9, wherein said ball holder has a coating formed of an insulating material foil having a cut-out portion in an area of said bore.

11. A method of joint welding of a shaped structural part with another structural part along a contact surface area therebetween, said method comprising the steps of providing a pressure- and heat-transmitting element having a hollow space; providing a plastically pressure-deformable constructional transmitting material which is formed as an easily pressure-deformable foil having a high melting temperature and located between the pressure- and heat-transmitting element and the shaped structural part; moving the pressure- and heat-transmitting element to apply pressure to the pressure-deformable transmitting material to deform the pressure-deformable transmitting material about the shaped structural part and to thereby press the shaped structural part and the another part together and also to receive a portion of the foil in the hollow space of the heat-transmitting element upon deformation of the foil, a contact surface between the deformed pressure-deformable transmitting material and the shaped structural part being greater than the contact surface between the shaped structural part and the another part along which the two structural parts are welded; and applying heat to the two structural parts to weld the two structural parts together.

* * * * *